United States Patent Office 3,550,404
Patented Dec. 29, 1970

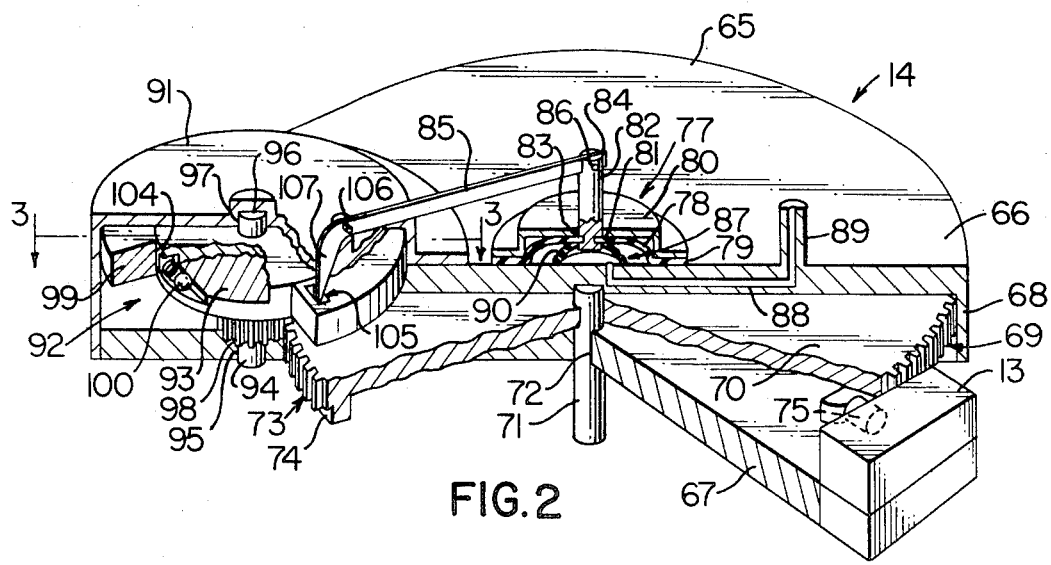

3,550,404
PNEUMATIC CONTROL SYSTEM AND PARTS
THEREFOR OR THE LIKE
Douglas R. Scott, Elkhart, Ind., assignor to Robertshaw Controls Company, Richmond, Va., a corporation of Delaware
Filed Nov. 15, 1968, Ser. No. 776,224
Int. Cl. D06f 33/10
U.S. Cl. 68—12                                    6 Claims

ABSTRACT OF THE DISCLOSURE

This disclosure relates to a laundry machine wherein the rotating laundry confining drum or tub is operatively interconnected to a vacuum pump to cause continuous operation of the vacuum pump during the entire movement of the confining means so as to provide a source of vacuum for controlling vacuum operated actuators of the apparatus. In addition, a pneumatically operated timer controlling the "on-off" operation of the laundry machine is repetitively actuated and deactuated by the movement of the laundry confining means.

---

This invention relates to a pneumatic control system as well as to an improved pneumatic pump and pneumatically operated timer means for such a control system or the like.

It is well known that a laundry apparatus or the like can have the cycle of operation thereof controlled by pneumatically operated actuators operated in a predetermined sequence by a timer driven program means, the pneumatic source for such a control system being provided by a vacuum pump or the like and the period of operation of the apparatus being controlled by the electrical timer motor or the like.

One of the features of this invention is to provide such a pneumatically controlled apparatus wherein the vacuum source for the control system of the apparatus is operated directly from the continuous movement of a working part of the apparatus.

Another feature of this invention is to provide a pneumatically operated timer means for controlling the on-off cycle of operation of the apparatus, the pneumatically operated timer means being controlled by the continuous movement of a working part of the apparatus.

In particular, the embodiment of this invention hereinafter illustrated and described includes a rotatable laundry receiving drum or tub of the apparatus which has cam means for operating a rocker arm in a repetitive manner with the rocker arm controlling the pumping operation of a vacuum pump to provide the pneumatic source for the control system. In addition, the repetitive rocking motion of the rocker arm controls a valve member disposed in fluid communication with the pneumatically operated timer means so as to repetitively and effectively interconnect and disconnect the pneumatically operated timer to and from the vacuum source so as to cause a movable timer member to be advanced through the entire cycle of operation thereof with the movable timer member controlling the on-off operation of the apparatus.

Accordingly, it is an object of this invention to provide an improved pneumatic control system having one or more of the novel features set forth above or hereinafter shown or described.

Another object of this invention is to provide an improved pneumatic pumping arrangement for such a control system or the like.

Another object of this invention is to provide an improved pneumatically operated timer means for such a control system or the like.

Other objects, uses and advantages of this invention are apparent from a reading of this description which proceeds with reference to the accompanying drawings forming a part thereof and wherein:

FIG. 2 is a fragmentary perspective view, partially in cross section, illustrating the improved pneumatically operated timer means of this invention.

FIG. 3 is a fragmentary cross-sectional view taken substantially on line 3—3 of FIG. 2.

FIG. 4 is a fragmentary, enlarged side view of a part of the timer means of FIG. 2 and illustrates the same in one of its operating positions.

FIG. 5 is a view similar to FIG. 4 and illustrates the timer means in another operating position thereof.

Figure 1:
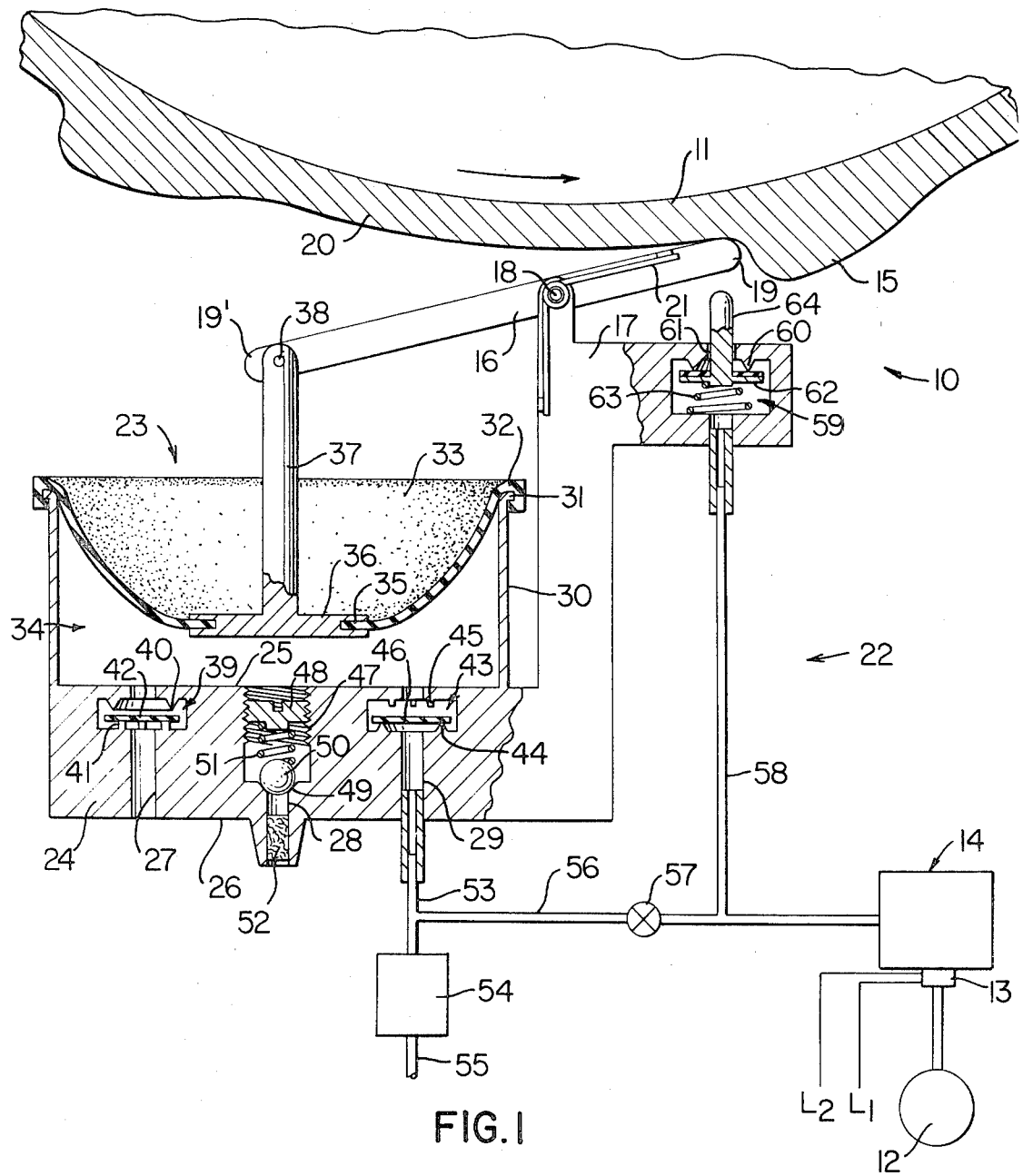
FIG. 1 is a schematic view, partially in cross section, illustrating the improved control system of this invention.

While the various features of this invention are hereinafter described and illustrated as being particularly adaptable for controlling the operation of a laundry apparatus, it is to be understood that the various features of this invention can be utilized singly or in any combination thereof to provide control means for other types of apparatus as desired.

Therefore, this invention is not to be limited to only the embodiment illustrated in the drawings, because the drawings are merely utilized to illustrate one of the wide variety of uses of this invention.

Referring now to FIG. 1, a laundry apparatus of this invention is generally indicated by the reference numeral 10 and comprises a rotatable laundry receiving drum or tub 11 adapted to be driven continuously in the counterclockwise direction of the arrow of FIG. 1 as long as an electrical motor 12 is energized by being placed across power source leads $L^1$ and $L^2$ by an electrical switch 13 that is controlled by a timer means of this invention and schematically illustrated and generally indicated by the reference numeral 14 in FIG. 1 with the specific details of the timer means 14 being illustrated in FIGS. 2–6 and hereinafter described.

The laundry confining means 11 has one or more cam elements 15 formed on the outer periphery thereof for causing repetitive rocking of a rocker arm 16 being pivotally mounted to suitable stationary frame means 17 of the apparatus 10 by a pivot pin 18. The rocker arm 16 has opposed ends 19' and 19 with the end 19 being continuously urged toward the outer peripheral surface 20 of the confining means 11 by a spring means 21. In this manner, the spring means 21 causes the end 19 of the rocker arm 16 to follow the contour of the outer peripheral surface 20 of the drum 11 so that when the drum 11 is rotating in the counterclockwise direction by the motor means 12, the cam means 15 on the drum 11 will cause repetitive rocking of the rocker arm 16 to perform a dual function in a manner hereinafter described.

The pneumatic control system for the laundry apparatus 10 is generally indicated by the reference numeral 22 in FIG. 1 and includes the pneumatically operated timer means 14 as well as a vacuum pump means that is generally indicated by the reference numeral 23 and will now be described.

As illustrated in FIG. 1, the frame means 17 includes a plate-like portion 24 having an upper surface 25 and a lower surface 26 interrupted by three bore means 27, 28 and 29 passing completely through the plate-like portion 24. A tubular portion 30 extends upwardly from the upper end 25 of the plate-like portion 24 outboard of the bores 27, 28 and 29 and has an upper end 31 secured to an outer peripheral means 32 of a flexible diaphragm 33 in a snap fit, sealed relation whereby the flexible diaphragm 33 cooperates with the tubular portion 30 to define a chamber 34 between the diaphragm 33 and the upper surface 25 of the plate-like portion 24. The flexible diaphragm 33 has its inner periphery 35 secured to a disc-like member 36 that carries an actuating post 37 that is pivotally mounted to the end 19' of the rocker arm 16 by a pivot pin 38.

The bore 27 in the plate-like member 24 includes a valve member receiving chamber 39 having a valve seat 40 at the upper side thereof and a plurality of spaced upwardly directed abutments 41 at the lower end thereof. A valve member 42 is disposed in the valve chamber 39 and is movable between the valve seat 40 and the abutments 41 in a manner hereinafter described.

Similarly, the bore 29 in the plate-like member 24 has a valve member receiving chamber 43 formed therein except that a valve seat 44 is disposed at the lower end thereof and a plurality of spaced abutment means 45 are provided at the upper end thereof and project downwardly. A valve member 46 is disposed in the chamber 43 and is movable between the valve seat 44 and abutment means 45 in a manner hereinafter described.

The bore means 28 in the plate-like member 24 is internally threaded at 47 to receive an externally threaded adjusting member 48. A valve seat 49 is provided in the bore 28 and a ball valve member 50 is continuously urged against the seat 49 by a compression spring 51 disposed between the threaded adjusting member 48 and the ball 50, the bore means 28 having a porous filtering material 52 disposed therein below the valve seat 49 for a purpose hereinafter described.

The bore means 29 of the pumping means 23 is fluidly interconnected to a conduit 53 that leads to an accumulator 54. The accumulator 54, in turn, is interconnected to a conduit 55 which can lead to a plurality of pneumatically operated actuators (not shown) for controlling various parts of the apparatus 10 in a manner well known in the art.

The conduit 53 is also fluidly interconnected to a conduit 56 which leads to the pneumatically operated timer means 14 as will be apparent hereinafter, the conduit 56 having a restriction 57 therein in advance of a branch conduit 58 fluidly interconnected to the conduit 56 intermediate the restrictor 57 and timer means 14.

The conduit 58 is fluidly interconnected to a chamber defining means 59 formed in the frame means 17 of the apparatus 10 and having a valve seat 60 at the upper end thereof that leads to the atmosphere by a passage means 61 passing through the valve seat 60. A valve member 62 is disposed in the chamber 59 and is normally urged into seating engagement with the valve seat 60 by a compression spring 63. The valve member 62 has a valve stem 64 projecting therefrom and out through the passage 61 to be engageable by the end 19 of the rocker arm 16.

In particular, as the drum 11 is rotating in a counterclockwise direction in FIG. 1, the cam means 15 are so constructed and arranged that as the cam means 15 cams against the end 19 of the rocker arm 16 to cause the end 19 to move downwardly in FIG. 1, the end 19 of the rocker arm 16 engages against the valve stem 64 to move the valve stem 64 vertically downwardly and thereby open the valve seat 60 until the cam means 15 passes beyond the end 19 of the rocker arm 16 so that the spring means 21 can return the rocker arm 16 to the position illustrated in FIG. 1 and permit the valve member 62 to again seat against the valve seat 60 under the force of the compression spring 63 for a purpose hereinafter described.

The timing means 14 of FIG. 1 is illustrated in detail in FIGS. 2–5 and will now be described.

As illustrated in FIG. 2, the timing means 14 includes a stationary frame means 65 having upper and lower plate means 66 and 67 being held in spaced relation by side wall means 68 to define a chamber 69 therebetween that receives a rotatable disc-like member 70 mounted for rotation in the chamber 69 by a shaft means 71 interconnected thereto and passing through a bore 72 in the lower plate member 67. The rotatable disc 70 has a ring gear means 73 on the outer periphery thereof and a cam track 74 on the under side thereof adapted to engage against a plunger 75 of the previously described electrical switch 13 that is carried on the plate means 67. As long as the cam track 74 is engaging the plunger 75 of the electrical switch 13, the plunger 75 is held in a position to complete a circuit through the switch 13 so that the power source leads $L^1$ and $L^2$ are placed across the main motor 12 whereby the main motor 12 is energized and continuously drives the laundry confining means 11. However, when a portion of the cam track 74 ceases to engage against the plunger 75, the plunger 75 moves outwardly to disconnect the power source leads $L^1$ and $L^2$ from the electrical motor 12 to terminate the operation of the apparatus 10.

Thus, a suitable selector knob can be mounted on the shaft 71 of the rotatable disc 70 so that the housewife or the like can manually set the disc 70 in any desired starting position thereof whereby the timing means 14 of this invention will continue to operate for the selected period of time as will be apparent hereinafter to continuously rotate the laundry confining means 11 until an end of the cam track 74 reaches the plunger 75 of the electrical switch 13 to terminate not only the operation of the electrical motor 12, but also to terminate the operation of the control system 22 of this invention as will be apparent hereinafter.

A pneumatically operated actuator 77 is carried by the frame means 65 and comprises a flexible diaphragm 78 having its outer periphery 79 held against the top plate 66 by a suitable housing member 80 secured to the top plate 66 in any suitable manner. The inner periphery 81 of the flexible diaphragm 78 is interconnected to an actuating post 82 that passes out through the opening 83 in the housing member 80 to be pivotally interconnected to one end 84 of a rocker arm 85 by a pivot pin 86. The flexible diaphragm 78 cooperates with the top surface of the upper plate 66 of the frame means 65 to define a chamber 87 therebetween which is disposed in fluid communication with a passage means 88 formed in the top plate 66 and being fluidly interconnected to the right hand end of the conduit 56 of FIG. 1 by a tubular nipple means 89. A compression spring 90 is disposed in the chamber 87 to tend to urge the flexible diaphragm 78 to its deactuated position illustrated in FIG. 2.

Another housing member 91 is carried by the frame means 65 and cooperates with the lower plate 67 to define a chamber 92 therebetween that rotatably receives a first cylindrical disc 93 having a shaft 94 interconnected thereto and having its lower end received in a bore 95 in the plate 67, the shaft 94 having its upper end 96 being received in a suitable bore 97 in the housing member 91 so as to rotatably mount the cylindrical member 93 to the housing means 65. The shaft 94 carries a pinion gear 98 which is disposed in meshing relation with the ring gear means 73 of the rotatable timer disc 70 for a purpose hereinafter described.

An outer annular member 99 is disposed about the cylindrical member 93 and is clutched thereto by overrun clutch means comprising a plurality of balls 100 being received in notches 101 in the cylindrical member 93 and being urged along flat surfaces 102 thereof by compression springs 103, the flat surfaces 102 of the cylindrical member 93 being angularly disposed relative to the cylindrical inner side wall 104 of the annular member 99.

In this manner, as long as the annular member 99 is rotated in a clockwise direction in FIG. 3 in a manner hereinafter described by the rocker arm 85, the counterclockwise rotating annular member 99 causes the balls 100 to clutch into the flat surfaces 102 of the cylindrical member 93 and carry the same therewith in a counterclockwise direction whereby the pinion gear 98 also moving in a counterclockwise direction will cause clockwise movement of the timer disc 70 because of the meshing relation between the pinion gear 98 and the ring gear means 73.

However, should the housewife or the like rotate the timer disc 70 in a counterclockwise direction through the shaft means 71 thereof to position the timer disc 70 at a desired starting position thereof, such counterclockwise movement will cause clockwise movement of the cylindrical member 93 and non-movement of the outer annular member 99 because the clutch balls 100 will not be disposed in wedging relative relation between the clockwise movement cylindrical member 93 and the cylindrical side wall means 104 of the annular member 99.

The annular member 99 has a slot 105 formed in the outer periphery thereof which cooperates with the rocker arm 85 in a manner now to be described.

The rocker arm 85 has an intermediate portion thereof pivotally mounted to the housing member 91 by a pivot pin 106. The left hand end 107 of the rocker arm 85 defines a pointed tongue 108 that is received in the slot 105 of the annular member 99.

When a vacuum is being imposed in the chamber 87 of the actuator 77 of the timing means 14 of this invention, the resulting pressure differential being created across the diaphragm 78 moves the diaphragm 78 downwardly in opposition to the force of the compression spring 90 whereby the rocker arm 85 has the end 84 thereof moved downwardly and the end 107 thereof moved upwardly to the position illustrated in FIG. 4. Thus, it can be seen that the pointed tongue 108 is positioned against the right hand edge 105A of the slot 105 of the annular member 99 so that upon subsequent return of the chamber 87 of the actuator 77 to atmospheric conditions, the compression spring 90 moves the diaphragm 78 upwardly to the position illustrated in FIG. 2 whereby the rocker arm 85 is moved in such a manner that the left hand end 107 thereof is moved downwardly from the position illustrated in FIG. 4 to the position illustrated in FIG. 5 whereby the tongue 108 acts against the right hand side 105A of the slot 105 to cam the annular member 99 in a counterclockwise direction from the position illustrated in FIG. 4 to the position illustrated in FIG. 5. In this manner, the clutch balls 100 cause the member 93 to be indexed one increment in a counterclockwise direction, and, thus, cause the timer disc 70 to be advanced one increment in a clockwise direction.

With the rocker arm 85 now disposed in the position illustrated in FIG. 5, subsequent actuation of the actuator 77 by the interconnection of the vacuum source to the chamber 87 thereof in a manner hereinafter described causes the rocker arm 85 to have the end 84 thereof pulled downwardly and the end 107 thereof moved upwardly from the position illustrated in FIG. 5 back to the position illustrated in FIG. 4. However, as the tongue 108 is being moved upwardly against the left hand side 105B of the slot 105, the tongue 108 causes the annular member 99 to be moved in a clockwise direction. However, the member 93 is not moved by the clockwise moving annular member 99 because the clutch balls 100 do not clutch with the member 93 when the annular member 99 is moved in a clockwise direction whereby the member 93 and timer disc 70 remain stationary during upward movement of the left hand end 107 of the rocker arm 85.

Thus, it can be seen that upon repetitive actuation and deactuation of the actuator 77, the rocker arm 85 will be rocked back and forth in such a manner that the tongue 108 thereof causes the annular member 99 to be driven in an alternating clockwise and counterclockwise direction in FIG. 2 and, thus, through the pinion gear 98 and ring gear means 73, will cause increment movement of the timer disc 70 in a clockwise direction during the clockwise movement of the annular member 99.

Therefore, it can be seen that both the vacuum pump 23 and pneumatically operated timer means 14 of this invention can be formed from relatively few parts in a simple and effective manner to function to control the apparatus 10 in a manner now to be described.

When the housewife or the like desires to operate the apparatus 10, the housewife sets the timer disc 70 by means of the shaft means 71 in any desired starting position thereof from the stopping position of the disc 70 whereby in the selected starting position of the disc 70, the cam track 74 thereof has moved the plunger 75 of the switch 13 inwardly to complete the circuit therethrough so that the main motor 12 is energized and will remain energized until the timer disc 70 is subsequently rotated from its selected starting position to its end of cycle position where the cam track 74 terminates so as to permit the plunger 75 of the electrical switch 13 to move outwardly and disconnect the power source $L^1$ and $L^2$ from electric motor 12.

Since the electric motor 12 is now operating to rotate the laundry receiving drum 11 in a counterclockwise direction as illustrated in FIG. 1, the cam means 15 thereof cause repetitive rocking of the rocker arm 16 in the manner previously described whereby an initial upward movement of the end 18 of the rocker arm 16 carries the flexible diaphragm 33 of the vacuum pump 23 therewith so that the volumetric capacity of the chamber 34 increases and causes a pressure differential across the valve member 42 in the bore 27 in such a manner that the valve member 42 is held against the seat 40 so as to prevent any air from flowing into the increasing chamber 34 through the bore 27.

During the upward movement of the diaphragm 33 by the rocker arm 16, the increasing chamber 34 causes a pressure differential across the valve member 46 to move the valve member 46 away from the valve seat 44 and against the abutment means 45 so that the conduit means 53, 56 and accumulator 54 has the air therein drawn into the increasing chamber 34 of the pump 23.

Subsequently, the return of the rocker arm 16 back to the position illustrated in FIG. 1 causes the diaphragm 33 to move downwardly and thereby decrease the volumetric capacity of the chamber 34 so that the air being compressed therein causes the valve member 46 to close against the valve seat 44 and the valve member 42 to move away from the valve seat 40 and against the abutment means 41 in the manner illustrated in FIG. 1 so that the air being compressed in the decreasing chamber 34 will pass out through the open valve seat 40 and passage means 27 to the atmosphere.

Therefore, it can be seen that subsequent upward and downward movement of the diaphragm 43 by the repetitive action of the cam means 15 of the laundry drum 11 against the rocker arm 16 causes a pumping action to evacuate the accumulator 54 and conduit means 53 and 56 so that the resulting vacuum source can be utilized to operate various vacuum operated actuators interconnected to the conduit means 55.

In addition, the evacuation taking place in the conduit 56 also, through the restrictor 57, causes evacuation of the conduit 56 to the right of restrictor 56 in FIG. 1 as well as an evacuation in the conduit 58.

The evacuation in the conduit 56 to the right of the restrictor 57 in FIG. 1 causes an evacuation of the chamber 87 of the actuator 77 of the timer means 14 so as to cause the diaphragm 78 to be pulled vertically downwardly in FIG. 2 and move the rocker arm 85 to the position illustrated in FIG. 4.

However, when the rocker arm 16 in FIG. 1 has the end 19 thereof moved downwardly to provide an intake stroke of the vacuum pump 23 in the manner previously described by the cam means 15 acting against the end 19 of the rocker arm 16, the end 19 of the rocker arm 16 engages against the plunger 64 of the valve member 62 to move the valve member temporarily away from the valve seat 60 so that air can return into the conduit 58 and into the chamber 87 of the actuator 77 to deactuate the same to the position illustrated in FIG. 2 and thereby provide an increment of movement of the annular member 99 in a counterclockwise direction as illustrated in FIG. 5 so that the timer disc 70 is now advanced one increment in a clockwise direction of FIG. 2 from the previously described set starting point thereof toward its end of cycle position.

The temporary return of air into the conduit 58 by the open valve member 62 to deactuate the actuator 77 of the timer means 14 does not affect the vacuum created in the accumulator 54 by the continuously operating vacuum pump 23 because of the restrictor means 57 in the conduit 56.

Subsequently, when the cam means 15 passes beyond the rocker arm 16 to cause the rocker arm 16 to move back to the position illustrated in FIG. 1 to provide an exhaust stroke of the vacuum pump 23, the valve member 62 returns to its closed position against the valve seat 60 so that the actuator 77 can again be evacuated to return the rocker arm 85 to the position illustrated in FIG. 4.

Therefore, it can be seen that not only does the cam means 15 of the continuously moving laundry drum 11 cause a pumping operation of the vacuum pump 23, but also the cam means 15 causes a repetitive, effective actuation and deactuation of the timer actuator 77 whereby the timer disc 70 is repetitively advanced in a clockwise direction until the end of the cam 74 thereof reaches the plunger 75 of the electrical switch 13 at which time the electrical switch 13 is opened so as to terminate the operation of the motor 12. The termination of the operation of the motor 12, of course, stops the rotation of the drum 11 and, thereby, stops the operation of the vacuum pump 23 and the pneumatically operated timer means 14 until the housewife or the like again sets the timer means 14 in a desired starting position thereof.

During the aforementioned operation of the vacuum pump 23 by the continuously moving laundry drum 11, the ball valve 50 in the bore means 28 acts as a vacuum regulator so that too great of a vacuum will not be imposed on the accumulator 54 and the interconnecting conduits from a desired vacuum value.

In particular, as the degree of vacuum increases in the chamber 34 of the vacuum pump 23, a pressure differential is created across the ball valve 50 and when that pressure differential exceeds the force of the compression spring 51 tending to maintain the ball valve 50 against the valve seat 49, the ball valve 50 is moved upwardly so that air can enter the chamber 34 through the porous filtering material 52 and opened valve seat 39 and thereby prevent too great of a vacuum value being imposed on the accumulator 54. Thus, by merely setting the threaded relationship of the adjusting member 48 relative to the plate 24, the force of the compression spring 51 can be adjusted so as to cause the vacuum pump 23 to maintain a particular vacuum value in the accumulator 54 during the operation of the vacuum pump 23.

Thus, it can be seen that this invention not only provides an improved pneumatic control system for an apparatus or the like, but also this invention provides an improved pneumatic pumping means as well as an improved pneumatically operated timer means for such a control system or the like.

What is claimed is:

1. In an apparatus having a member driven continuously during a cycle of operation of said apparatus, the improvement comprising a pneumatic source, a pneumatic actuator, a timer for starting and stopping the cycle of operation of said apparatus and being operatively interconnected to said actuator to be controlled by the operation of said actuator between its actuated and deactuated conditions, interconnection means interconnecting said source to said actuator to actuate the same, and means operatively interconnecting said driven member to said actuator to repetitively cause deactuation of said actuator and thereby operation of said timer between its starting and stopping positions.

2. In an apparatus as set forth in claim 1, said driven member comprising a rotatable drum for receiving laundry and the like.

3. In an apparatus as set forth in claim 1, said last-named means comprising a valve means disposed in fluid communication with said interconnection means for effectively interconnecting said actuator to the atmosphere when said valve means is opened and for effectively interconnecting said actuator to said source when said valve means is closed.

4. In an apparatus as set forth in claim 3, said driven member having means operatively interconnected to said valve means to repetitively open and close said valve means.

5. In an apparatus as set forth in claim 1, said apparatus having an electric motor for driving said member as long as said motor is energized, said timer having a movable member that is moved between its operating positions by said actuation and deactuation of said actuator, said movable member having means for energizing said motor as said movable member moves between its operating positions.

6. In an apparatus as set forth in claim 1, said pneumatic source comprising a pneumatic pump having a pumping member, said driven member being operatively interconnected to said pumping member to repetitively move said pumping member as said driven member is driven and thereby provide said pneumatic source.

References Cited

UNITED STATES PATENTS

| | | | |
|---|---|---|---|
| 2,837,118 | 6/1958 | Allen | 137—624.22X |
| 2,960,856 | 11/1960 | Bauerlein et al. | 68—12 |
| 3,048,026 | 8/1962 | Bochan et al. | 68—12 |

WILLIAM I. PRICE, Primary Examiner

U.S. Cl. X.R.

74—53